April 5, 1927.
G. S. NEELEY
1,623,943
LEATHER TREATING PROCESS AND APPARATUS FOR SAME
Filed May 31, 1923     2 Sheets-Sheet 1
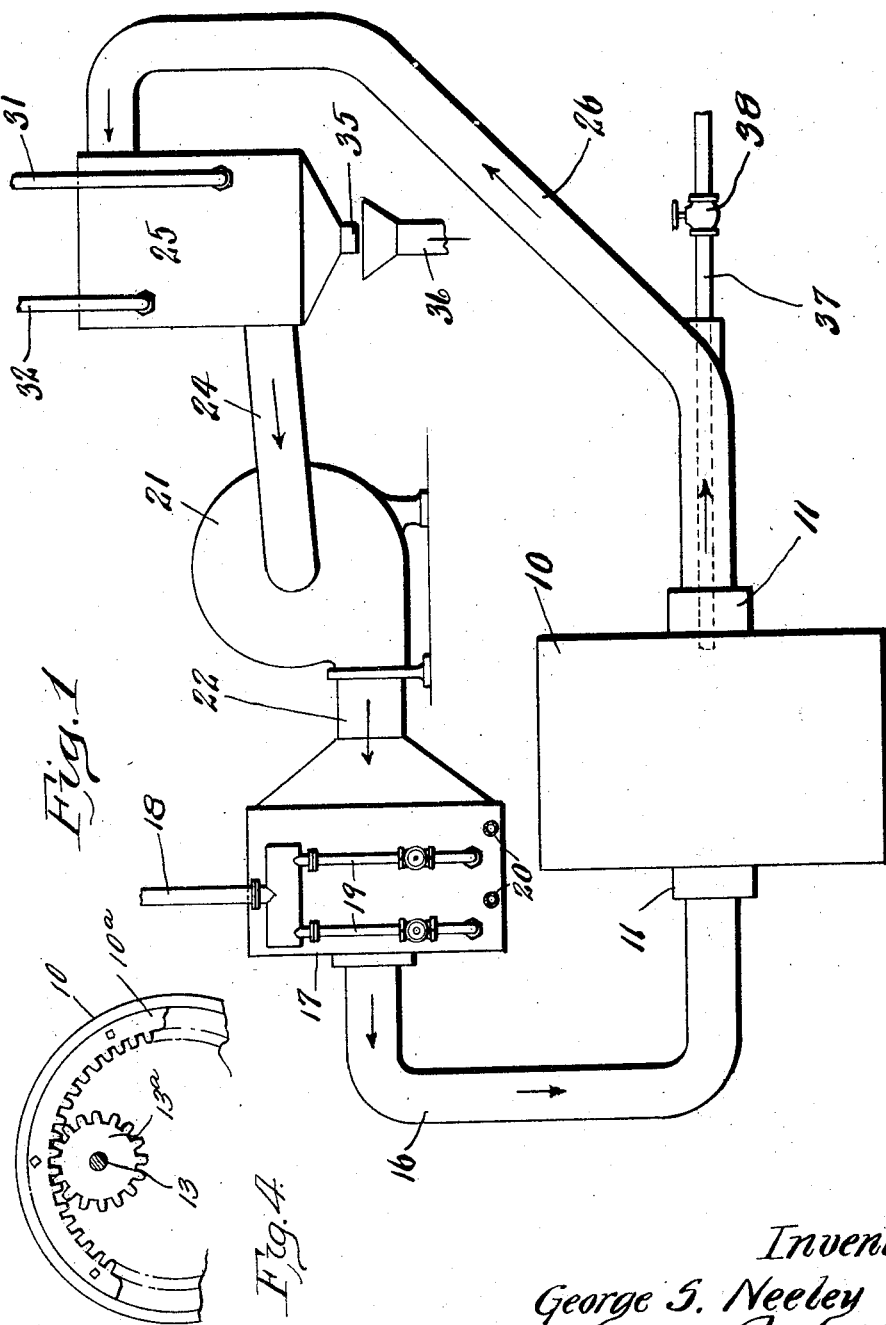
Inventor
George S. Neeley
By William Janus Atty

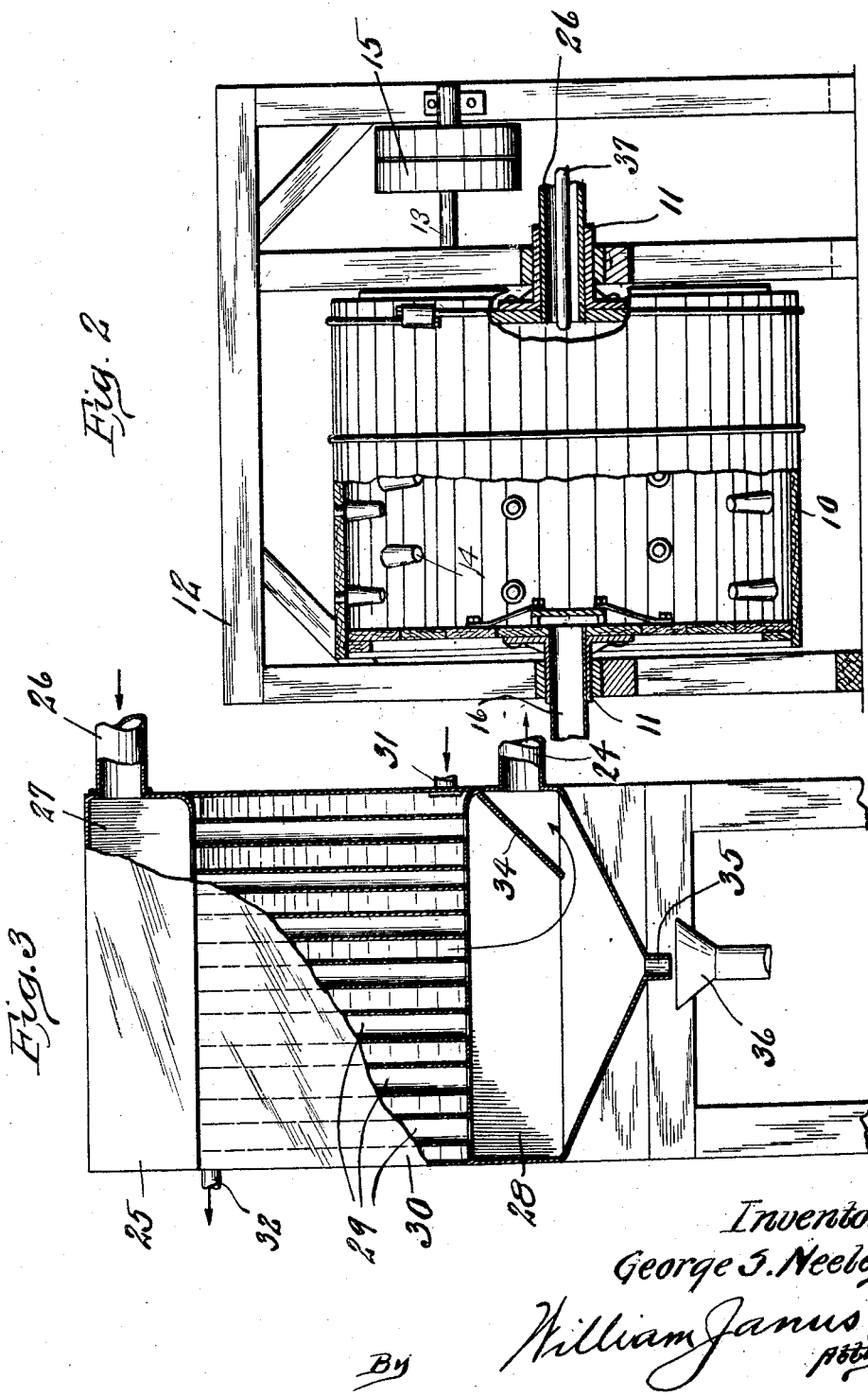

Patented Apr. 5, 1927.

1,623,943

UNITED STATES PATENT OFFICE.

GEORGE S. NEELEY, OF WOOD RIVER, ILLINOIS.

LEATHER-TREATING PROCESS AND APPARATUS FOR SAME.

Application filed May 31, 1923. Serial No. 642,640.

My invention relates to a process and apparatus for conditioning the air or heating medium circulated through the system whereby the moisture content and the temperature thereof can be controlled.

My invention is particularly applicable for use in tanning industries in combination with the stuffing or dubbing drum or apparatus.

In the treatment of leather, the hides after the tanning process are placed in a revolving stuffing drum or chamber where they are heated and tumbled or milled and treated with certain greases or dubbing in order to work the leather and make it soft and pliable. Heretofore it has been the practice to heat the drum by admitting hot air or steam directly into the drum and heating the same until the temperature rises to about 200—225° Fahrenheit. The drum is then opened and the leather stock to be treated is placed in the drum. After closing the drum, the same is operated to work the leather for a predetermined length of time before adding the hot grease.

In practice, it is found by using hot air alone for initially heating the interior of the drum that it requires anywhere from thirty to forty minutes, or even longer, to bring the temperature of the drum to the desired point of 200—225° F. This consumption of time in the initial heating of the stuffing drum greatly retards the efficiency of the drum as regards the amount of leather stock that can be handled.

Some tanners resort to the use of live steam for heating the interior of the stuffing drum in lieu of hot air. This method has been found mussy and unsatisfactory to operate on account of the great amount of condensate that necessarily accumulates in the drum. This accumulated moisture interferes to a great extent with the proper absorption of the greases by the leather stock. Furthermore, the necessity of opening the drum, after the same has been heated, for the purpose of placing the leather stock therein, allows a portion of the heat to escape from the drum thereby lowering the temperature thereof and necessitating fresh air or steam to be injected into the drum to bring the temperature to the required point. This not only calls for a greater amount of steam or hot air but also renders the temperature of the interior of the drum uncertain and variable, thereby greatly affecting the efficiency of the stuffing drum. This condition is especially aggravated in damp weather when the fresh air admitted to the stuffing drum is laden with moisture and when great difficulty is experienced in bringing the temperature of the drum to the desired point for the purpose of partially drying or driving the moisture out of the leather stock.

The objects of my invention are to provide a system for treating leather wherein the temperature and humidity of the heating medium and the interior of the drum are controlled at will regardless of the atmospheric conditions and in which the heating medium is reheated and recirculated through the system thereby rendering the same more efficient and more economical to operate.

Further objects of my invention are to provide a system for treating leather whereby the stuffing drum may be initially heated by live steam to the desired degree and then all the surplus moisture driven from the drum before the leather stock is placed in the drum.

Still further objects of my invention are to provide a system wherein the temperature of the heating medium can be maintained at the desired degree at all stages of the milling operation so that the leather stock is in proper relation to receive and absorb the greases called dubbing.

Another object of my invention is to provide a system for treating leather in which the moisture content of the heating medium can be controlled at will irrespective of the humidity of the atmosphere so that a proper degree of humidity is maintained in the drum and the excess moisture is extracted from the hides and discharged from the system.

With these and other objects in view my invention consists in certain novel features of construction and arrangement of parts hereinafter more fully described, claimed, and illustrated in the accompanying drawings, in which—

Figure 1 is a diagrammatic view of the system.

Figure 2 is a side elevational view partly in cross section of the stuffing drum.

Figure 3 is a vertical cross section of the condenser.

Figure 4 is a detail view showing the drum driving means.

Referring by numerals to the accompanying drawings, 10 indicates a revoluble stuffing drum having hollow trunnions 11 which are journaled in suitable bearings arranged in supporting frame 12. The peripheral wall of the drum is provided with inwardly projecting pins 14 which are designed as the drum revolves to pick up the hides or leather stock placed in the drum and tumble or agitate it. The leather stock is placed in the drum through a suitable door formed in one of the end walls thereof. The drum is operated by means of a belt driven pulley 15 which is fixed to a shaft 13 carrying a pinion 13ª, which meshes with an internal gear 10ª fixed to one end of said drum 10, as shown in Figure 4. Communicating with the interior of the drum through one of the hollow trunnions 11, is one end of a hot air pipe 16, the opposite end of which is connected to a heater 17. The air in heater 17 is heated by a series of pipes which are supplied with live steam by a main supply pipe 18 and branch pipes 19, while return pipes 20 convey the steam back to the boiler from the heating pipes. The air to be heated is supplied to the heater 17 by a fan blower 21 which has a discharge end connected to the heater by a pipe 22. The intake end of the blower is connected by a pipe 24 to a condenser 25 which receives the cold air from the opposite end of drum 10 by means of a pipe 26 which communicates with the interior of the drum through the other one of trunnions 11. Condenser 25 consists of air chambers 27 and 28 with which communicate the pipes 26 and 24 respectively. These chambers are connected by a series of tubes 29 which are located in a cooling or condensing chamber 30. This cooling chamber is cooled by water which is circulated therethrough by pipes 31 and 32. Chamber 28 is provided, adjacent to outlet pipe 24, with a baffle plate 34 which prevents any condensate dripping from tubes 29 from being drawn into the outlet pipe 24. The lower end of chamber 28 is provided with a downwardly presented constricted mouth 35 through which the condensate is discharged from the condenser and is conveyed away in any suitable manner, such as a waste pipe 36 which is arranged below mouth 35. A live steam pipe 37 passes through the lower end of pipe 26 and communicates with the interior of the drum whereby live steam may be injected thereinto. A valve 38 is arranged in pipe 37 and controls the admission of live steam to the drum.

In the operation of my system, the drum is first heated to the desired temperature by means of live steam which is admitted thereinto by opening valve 38 and by hot air which is forced into the drum through pipe 16 by blower 21. After the temperature in the drum has been brought to the proper degree, the supply of steam is shut off while the hot air circulating apparatus continues in operation. The operation of blower 21 produces suction in pipes 26 and 24 causing the steam and air contained in the drum to be drawn through pipe 26 into condenser 25. The steam in passing through tubes 29 is condensed and the condensate is discharged through mouth 35. The air passes from chamber 28 through pipe 24 to the blower and is then forced into the heater 17 where it is heated by the live steam pipes which are supplied with steam by main pipe 18 and branch pipes 19. The heated air is forced under pressure through pipes 16 into the interior of drum 10. The circulation of hot air through the system continues until all the moisture has been driven out from the air or a certain degree of humidity has been reached. The hides from which the liquid has been forced out as much as possible by presses are now placed in the drum and the drum is actuated by belt driven pulley 15 for a suitable period of time. While the drum is actuated the hot air is circulated through the system and in passing through the drum comes in contact with the leather stock and absorbs the moisture given off by said stock. The moisture laden air is drawn through the condenser 25 where the moisture is separated from the air and is discharged from the system while the air is forced by the blower to the heater 17 where it is reheated and is then recirculated through the system. This operation is continued until all the excess moisture has been driven out of the leather stock and the leather is in proper condition for receiving the dubbing or greases which are then introduced into the drum. The drum containing the greases and the leather stock is then again actuated so that the stock is thoroughly worked in said greases and the circulation of the heating medium is continued during this operation in order to maintain the temperature of the drum and the material contained therein in a condition most advantageous for the absorption of the greases by the fibers of the leather.

I claim:

1. A leather treating process consisting in placing the leather in a revoluble container closed to the atmosphere, admitting steam thereinto and circulating hot air through said container for heating same and conveying away therefrom vapor, and reheating such air and extracting the vapor therefrom before readmitting said reheated air to said container for controlling the amount of moisture in said container.

2. A leather treating process consisting in placing leather in a closed revoluble container, initially heating said container with live steam, and then circulating under pressure hot air through said container for controlling the amount of moisture in said container.

3. A leather treating apparatus comprising in combination with a revoluble stuffing drum for receiving the leather stock, means for admitting live steam thereinto, air heating means connected to said drum for conveying hot air thereinto, means for exhausting the air from said drum and returning it to said heating means, and condensing means for extracting moisture from the air exhausted from the drum.

4. An apparatus for treating leather comprising in combination with a stuffing drum adapted to receive the leather stock, means for circulating and recirculating hot air through said drum, connections for admitting steam to said drum independently of said hot air means, and means for extracting moisture from the air that is being circulated through the drum.

5. An apparatus for treating leather comprising in combination with a leather stock container, of means for initially heating said container by live steam, an air heater, a pipe connection between said heater and said container for conveying hot air thereinto, a return pipe for conveying away the air after traversing said container, a condenser connected to said return pipe for condensing and discharging the moisture contained in the air supplied by said return pipe, and means connected to said condenser and said heater for circulating the air under pressure through said system.

6. In an apparatus for treating leather the combination of a stuffing drum, means for heating said drum by hot air and live steam, and means for removing the moisture from the interior of the drum by condensation.

7. In an apparatus for treating leather the combination of a stuffing drum, a hot air heater, and a live steam supply means adapted to simultaneously heat said drum, and a condenser for controlling the amount of moisture contained in the hot air supplied by said hot air heater.

8. An apparatus for treating leather comprising in combination a stuffing drum closed to the atmosphere, means for supplying thereto hot air under pressure, connections for supplying live steam to said drum, means for returning the mixture of live steam and hot air from said stuffing drum to said supply means, and a means for controlling the amount of moisture held in suspension by said mixture.

9. An apparatus for treating leather comprising in combination a stuffing drum, means for heating said drum simultaneously by live steam and hot air, and means for condensing and discharging the moisture contained in the hot air.

10. In an apparatus for treating leather the combination of a stuffing drum closed to atmosphere, means for circulating hot air and steam through said stuffing drum, means for reheating the mixture of hot air and steam, and condensing means for controlling the amount of moisture allowed to recirculate with the hot air through the system.

In testimony whereof I hereunto affix my signature this 29th day of May, 1923.

GEORGE S. NEELEY.